July 22, 1969    A. P. ANDERSON    3,456,519
PULLEY AND SHAFT SUPPORT ATTACHMENT FOR A ROTARY MOTOR
Filed Oct. 4, 1967
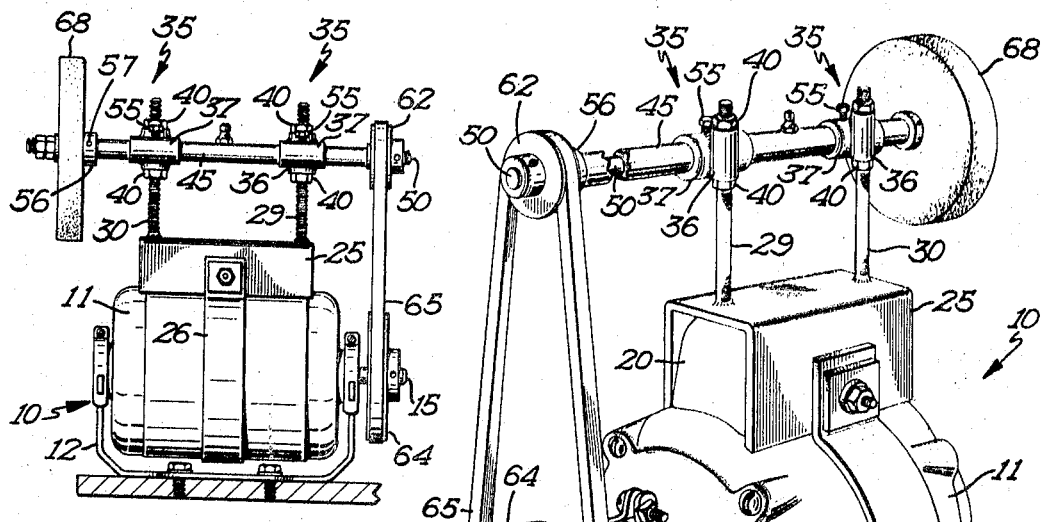
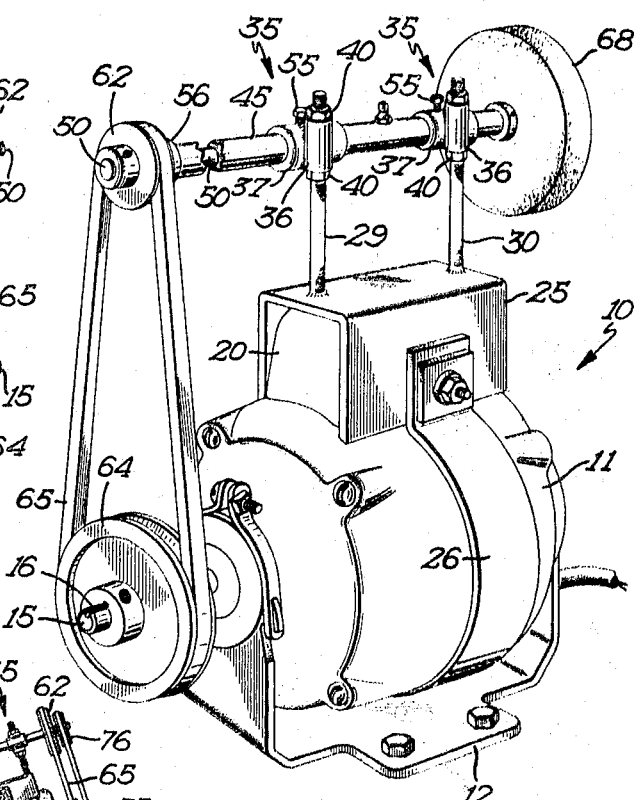
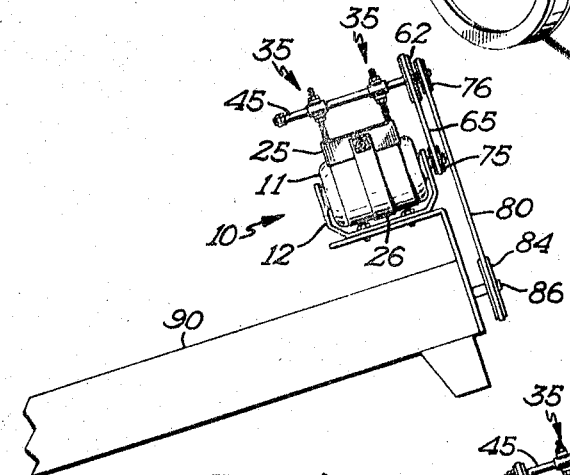
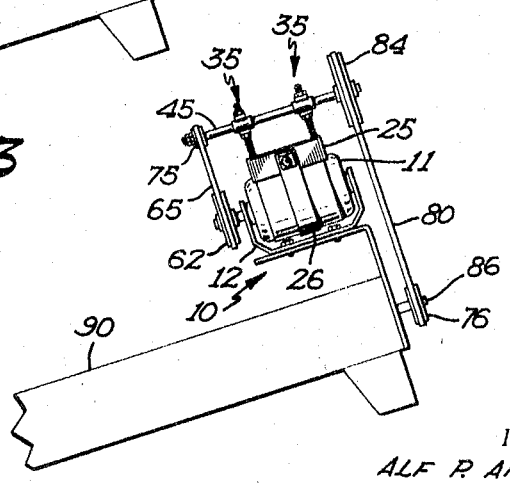
FIG 2
FIG 1
FIG 3
FIG 4
INVENTOR.
ALF P. ANDERSON
BY
Schroeder, Siegfried
& Ryan
ATTORNEYS

United States Patent Office 3,456,519
Patented July 22, 1969

3,456,519
PULLEY AND SHAFT SUPPORT ATTACHMENT FOR A ROTARY MOTOR
Alf P. Anderson, Box 357, Pelican Rapids, Minn. 56572
Filed Oct. 4, 1967, Ser. No. 672,771
Int. Cl. F16h 7/14, 7/24; H02k 7/10
U.S. Cl. 74—242.14
2 Claims

ABSTRACT OF THE DISCLOSURE

This invention relates to a pulley and shaft support attachment for a rotary motor of the electrical type in which a simplified bracket is mounted on the motor housing and provides a countershaft mounting for desired pulley arrangements in which the countershaft is adjustably positioned in the mounting to provide for proper belt tightening for driving purposes and various pulley arrangements for opposite directions of rotation and variable speeds of output from a fixed speed unidirectional electric motor.

---

This invention relates to rotary motor drives and more particularly to an improved pulley and shaft support attachment for a rotary motor particularly of the electrical type.

Pulley type coupling arrangements for driving from an electrical motor are known and in use. The present invention is directed to an improved pulley and shaft support attachment for rotary motors and in particular for electrical motors in which the attachment is mountable on the motor housing and provides a countershaft which may be adjustably positioned to provide proper tensioning of the belt drive between pulleys on the output shaft of the motor and the countershaft to permit interchange in the size of pulleys for varying speed ratios by pulley selection and further provides an arrangement by which an output rotation may be taken from either end of the countershaft for varying directions of output rotation from an unidirectional motor.

Therefore, it is the principal object of this invention to provide an improved pulley and shaft support attachment for rotary motors.

Another object of this invention is to provide a pulley and shaft support attachment particularly adapted for electric motors in which the attachment is mountable on the motor to provide a simplified arrangement of parts.

Another object of this invention is to provide an improved pulley and shaft support attachment for motors in which the attachment is mountable on the motor to permit positioning of the motor in varying positions for opposite directions of output rotations.

These and other objects of this invention will become apparent from a reading of the attached description together with the drawings wherein:

FIGURE 1 is a side elevational view of the improved pulley and shaft support attachment for motors and shown applied to an electric motor, FIGURE 2 is a perspective view of the pulley and shaft support attachment mountable on a motor, FIGURE 3 is a schematic view of an arrangement of parts to provide a predetermined direction of output rotation from a given motor rotation, FIGURE 4 is a schematic view of the mounting of the attachment and the motor for a reversed direction of an output rotation from a given motor rotation.

My improved pulley and shaft support attachment for rotary motors is shown in the drawings as applied to an electric motor 10 of the capacitor type. It will be understood, however, that it will be applicable to any type of electric motor or rotary motive means which is normally connected through a belt drive to a shaft or tool to which the motor is to supply rotative power. This improved pulley and shaft support attachment permits ready interchangeability of pulleys to provide varying speed arrangements and interchangeability in the output drive connection therefrom to provide for reversed direction of rotation from a conventionally unidirectionally operated motor. It provides a very simplified arrangement of parts to accomplish this speed and direction adjustment. The electric motor and in particular the capacitor motor which utilizes a single phase electric source and a capacitor for providing a split phase operation, has a generally cylindrical housing 11 and is carried by a mounting bracket, such as is indicated at 12. The housing 11 for the motor 10 will normally be mounted in the bracket in such a manner that it may be suitably attached to any flat surface or to any co-operating brackets in a conventional manner. It would employ a single output shaft 15 with a suitable key arrangement 16 therein upon which a pulley could be mounted and secured. The capacitor motor normally employs a capacitor mounted externally on the surface of the same such as is indicated at 20 to provide a projection from the general cylindrical contour of the housing 11. The improved pulley and shaft support attachment includes a base member, shown herein as channel shaped or U-shaped in form at 25, which would be positioned over the capacitor and would be secured to the motor housing through a cylindrical strap 26 attached to the base member 25 through suitable nut and bolt means indicated at 28. This would position the base member securely on the cylindrical housing. The base member 25 has a pair of shaft or rod support members 29, 30 mounted thereon through suitable means such as welding or bolts, the shafts or rods being threaded throughout their extent and projecting outwardly from the base member and are normally positioned in a generally vertical position depending upon the position of the motor housing within the mounting bracket 12. The upstanding rod or support members which are in effect threaded shafts secured to the base member, mount respectively a coupling member, indicated generally at 35, which is formed of two tubular portions welded or similarly secured together to form an integral unit with the axis of the tubular portions being normal to one another and spaced from one another. Thus, as will be seen in the drawings, the coupling member 35 includes a tubular portion 36 which is adapted to fit over the threaded shaft or rod and slide thereon with suitable nuts 40 positioned above and below the same for the purpose of elevating the coupling members on the respective rods. The tubular portion 37 normal thereto provide a transversely extending tubular part which mounts a tubular casing 45 therein which extends transverse to the extent of the support rods 29, 30 and normal thereto with the coupling members on the support rods spacing the journal casing from a motor and generally parallel to the base member 20. The journal casing 45 mounts a countershaft 50 which is positioned in and journaled in the casing for rotative movement therein, the shaft extending beyond the extremities of the casing for the purpose of mounting the pulleys or work tools thereon. The tubular journal casing 45 is held in position on the transversely extending parts of the coupling members through suitable set screws 55 which thread through tapped apertures in the tubular portions 37 and bear against the casing to secure the same therein. As will be seen in the drawings, casing includes raised flange extremities 56 with a suitable pin positioned therein and indicated at 57 which will ride in a groove (not shown) in the shaft to position the shaft against sliding or axial movement and retain the countershaft in the casing in the same relative position during rotation.

As will be seen in FIGURES 1, 3 and 4, the countershaft 50 may mount a separate pulley 62 which would co-operate with a pulley 64 on an output shaft 15 of the motor with a suitable belt 65 riding in the grooved pulleys in a driving relationship. The relative size of the respective pulleys may be interchanged for high or low speed operation of the countershaft and the work tool or work drive associated therewith. For example, the countershaft may mount a suitable grinding tool 68 and if desired another tool on opposite extremity of the same to provide a dual working function with a high speed operation. With an interchange in the shape or diameter of the pulleys on the motor and countershaft, a similar low speed operation may be obtained for drive purposes. The particular position of the work tool or the drive connection thereto may be interchanged to either end of the countershaft, as will be seen hereinafter. By raising the coupling members 35 on the rods or threaded shafts 29, 30, the belt may be tightened for any pulley configuration to provide a positive driving relationship and the adjustment and the position of the coupling members will be effected merely by release of the nuts 40 on one side of the tubular parts and a threading in the opposite direction of the nuts on the opposite side of the coupling parts to raise or lower the coupling members to the shaft supports on which they are slidably mounted.

In FIGURES 3 and 4 are shown schematically various positionings of the pulley and shaft support attachment for the rotary motor to provide for reverse direction of rotation from the motor and variable speed arrangements therefrom. Thus, for example, in FIGURE 3, motor 10 is shown schematically as mounted with the rods 29 and 30 mounted on the base member 20 positioned on the motor and mounting the countershaft 50 in the tubular casing 45. The motor output shaft 15 at one extremity mounts a small pulley 75 which co-operates with a larger pulley 62 on a countershaft with a belt 65 coupling the pulleys and positioned in an aligned relationship. This will provide a step-down speed ratio from the speed of motor rotation and a similar small pulley 76 mounted on the countershaft adjacent the larger pulley 62 will be coupled through a belt 80 and a larger output drive pulley 84 mounted on a drive shaft 86 of a feed auger structure, indicated generally at 90, to provide a low speed drive to an auger with a predetermined direction of rotation. This rotation can be reversed, as shown in FIGURE 4, with a similar type of an arrangement and the speed increased, if desired. In FIGURE 4, the motor 10 is reversed in its mounting on the feed drive table 90 and with the reversed pulley configuration connected to the auger drive shaft 86 high-speed counter-rotation will be provided. Speed of operation may be changed readily by an interchange of the pulleys on the output shaft and the countershaft or by proper selection of any sized pulleys to provide any desired speed ratio from the given speed of output rotation of the motor. The coupling members through their adjusting nuts will position the countershaft through the positioning of the tubular casing 45 supporting the same to properly tighten the belt coupling the respective pulleys for proper driving relationship.

This improved pulley and shaft support attachment for electric motors provides a simplified arrangement for attaching to a conventional electric motor or a similar rotary motor, such as a split-phase capacitor motor, having a fixed speed of rotation and a fixed direction of rotation to enable it to be employed in many useful operations.

What is claimed is:

1. A pulley and shaft support attachment for a rotary capacitor type motor having a cylindrical housing with a capacitor positioned thereon and projecting therefrom and with a rotary output shaft extending therefrom comprising, a base member including a channel-shaped member adapted to fit over the capacitor on the cylindrical housing of the capacitor type rotary motor and strap means encircling the cylindrical motor housing and secured to the channel member to mount the channel member on the housing, rodlike support means including a pair of threaded shafts connected to the channel member in spaced parallel relationship and projecting outwardly from the base member and the cylindrical housing of the motor, coupling means for each of said support means each having a tubular portion slidably mounted on the rodlike support means which extend therethrough and a transversely extending tubular part formed integral therewith, said coupling means being mounted on the threaded shafts of the support means with one of the tubular portions being movable thereon and including nut means on the threaded shafts for raising and lowering the tubular portion relative to the threaded shaft to adjustably position the coupling means relative thereto and with the transversely extending tubular parts being axially aligned, a tubular casing mounted in the transversely extending tubular parts of the coupling means, a countershaft positioned in the tubular casing and extending beyond said casing at its extremities, means positioned on the countershaft and cooperating with the tubular casing to maintain the countershaft in journaled relationship in the tubular casing with fixed portions of the countershaft extending beyond the extremities of the tubular casing, pulley means positioned on the output shaft of the motor and on one extremity of said countershaft, a drive belt positioned on the pulley means and extending therebetween to couple the pulley means and transmit motion from the output shaft of the motor to the countershaft, said pulley means positioned on the output shaft of the motor and on the countershaft being adapted to be of varying sizes, said nut means on the threaded shafts being effective with adjustment for raising and lowering and retaining the coupling means on the shafts to vary the position of the coupling means and hence the pulley means on the countershaft relative to the motor housing to tighten said belt, and means on the countershaft for transmitting output rotation from said motor means.

2. The pulley and shaft support attachment for a rotary motor of claim 1 in which the means on the shaft for transmitting output of the motor includes additional pulley means selectively positioned at either end of the shaft to provide for varying directions of rotation of the countershaft in the transmission of the output of the motor.

References Cited

UNITED STATES PATENTS

| | | |
|---|---|---|
| 1,018,010 | 2/1912 | Schuyler. |
| 1,307,727 | 6/1919 | Davis _____ 74—242.14 XR |
| 1,823,273 | 9/1931 | Keniston _____ 74—242.14 |
| 1,906,415 | 5/1933 | Rauch _____ 74—242.14 XR |
| 2,443,267 | 6/1948 | Owens _____ 74—242.14 |
| 2,808,241 | 10/1957 | Beran _____ 74—242.13 XR |
| 2,960,883 | 11/1960 | Sznycer _____ 74—242.12 |

FRED C. MATTERN, Jr., Primary Examiner

JAMES A. WONG, Assistant Examiner

U.S. Cl. X.R.

310—66